(No Model.)
W. B. WALLACE.
PNEUMATIC BRAKE.
No. 532,298. Patented Jan. 8, 1895.
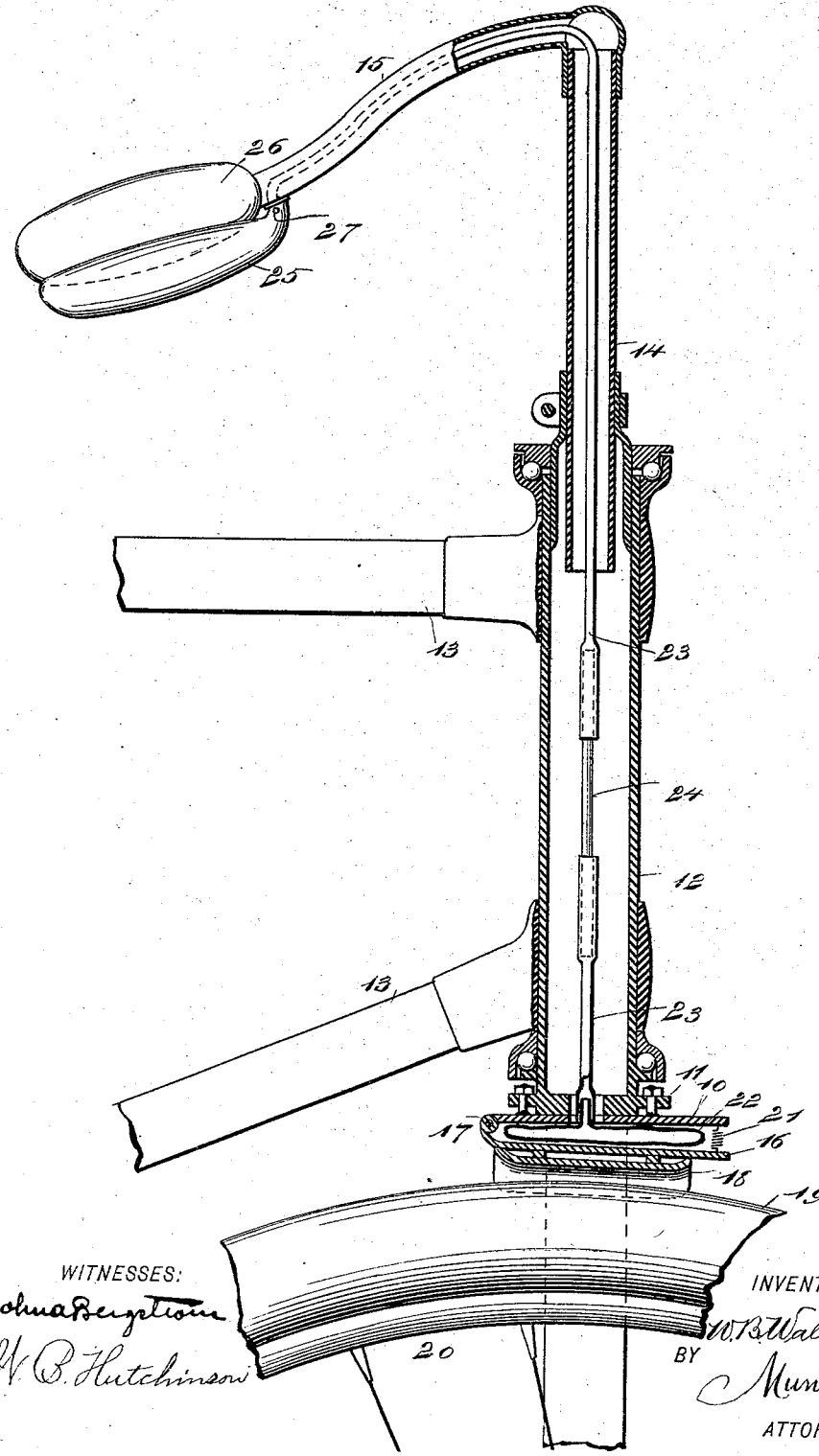
WITNESSES:
Joshua Bergstrom
W. B. Hutchinson
INVENTOR
W. B. Wallace
BY
Munn & Co.
ATTORNEYS.

UNITED STATES PATENT OFFICE.

WILLIAM B. WALLACE, OF NEW YORK, N. Y.

PNEUMATIC BRAKE.

SPECIFICATION forming part of Letters Patent No. 532,298, dated January 8, 1895.

Application filed June 23, 1894. Serial No. 515,499. (No model.)

*To all whom it may concern:*

Be it known that I, WILLIAM B. WALLACE, of New York city, in the county and State of New York, have invented a new and Improved Pneumatic Brake, of which the following is a full, clear, and exact description.

My invention relates to improvements in that class of brakes which are particularly adapted for use on bicycles, although my brake may be used on other vehicles; and the object of my invention is to produce an extremely cheap and inexpensive brake, which may be used either as a pneumatic or hydraulic brake, which is constructed in such a way that any desired pressure may immediately be brought to bear on the wheel, which has provision for instantly releasing the pressure, which does away with much of the mechanism usually employed in connection with brakes of this class, which has the hand bulb by which it is operated arranged in such a manner that it may be clasped at the same time one of the handles of the machine is clasped, and which has a portion of its structure out of sight in the hollow frame of the machine to which it is attached.

To these ends my invention consists of certain features of construction and combinations of parts, which will be hereinafter described and claimed.

Reference is to be had to the accompanying drawing, forming a part of this specification, in which the figure is a broken sectional elevation of the head portion of a safety bicycle provided with my improved brake.

My improved brake is provided with a supporting plate 10, which, as shown, is bolted to the flange 11 of the steering fork 12, this being mounted in the front end of the frame 13 in the usual manner, and in the upper portion of the fork is held the usual slide tube 14 which connects with the handle bars 15 and enables them to be adjusted vertically. This structure is common to bicycles and has nothing whatever to do with my invention.

The base plate 10 may be fastened in any convenient way, and I have shown the means specified to illustrate an operative way of holding it. The plate 10 has, on its under side, a hinge plate 16 which is hinged to the main plate 10, as shown at 17, and which carries a concave shoe 18 which may be of any approved material and is adapted to bear against the tire 19 of the wheel 20. The hinge plate and shoe are normally raised from the tire by a spring 21 which is secured to the hinge plate and to the plate 10 above it, and between the plates 10 and 16 is an inflatable bag 22 which is elastic but is strong enough to resist the air pressure within it, this bag connecting with the inflating tube 23 which is preferably of rubber but which has a section of rigid tube 24 to enable the length of the inflating tube to be adjusted to suit the height of the tube 14. The tube 23 extends upward through the tube 14 and out through one of the handle bars 15, where it terminates in a bulb 25 like the ordinary air bulb, this being made to partially encircle the handle 26 of the handle bar, so that both bulb and handle may be simultaneously and easily grasped. The bulb 25 has an ordinary escape valve 27 which may be pressed when the air in the bag 22 and tube 23 is to be released.

When the brake is to be applied, the bulb 25 is repeatedly squeezed, thus injecting air through the tube 23 and into the bag 22 which expands and forces down the hinge plate 16 upon the tire 19, thus braking the wheel 20. When the brake is to be released, the valve 27 is pressed so as to permit the escape of air, and the bag 22 then collapses while the spring 21 raises the brake shoe.

Instead of using air, the bulb 25 may be filled with water, and when the bulb is squeezed the water will be forced into the bag 22, thus expanding it, while on releasing the pressure from the bulb 25 the water will flow back and permit the brake shoe to rise.

I have shown my improved brake applied to a particular part of the machine, but it will be understood that the brake shoe and its accessories may be arranged in any convenient place, where the shoe may be brought to bear on the wheel, without departing from the principle of the invention.

Having thus described my invention, I claim as new and desire to secure by Letters Patent—

1. A brake, comprising a movable brake shoe, an expansible bag interposed between the shoe and a rigid abutment, and means for expanding the bag to apply the brake shoe and to collapse the bag to release the said shoe, substantially as described.

2. A brake, comprising a pair of plates hinged together, a brake shoe secured to one of the plates, a bag held between the plates, and means for inflating the bag to apply the shoe and to deflate the bag to release the shoe, substantially as described.

3. A brake, comprising a pair of plates hinged together and held together by a spring, a shoe carried by one of the plates, and an inflatable bag held between the plates, and adapted to be inflated to apply the shoe and to be deflated to release the shoe, substantially as described.

4. A pneumatic brake, comprising a pair of plates hinged together, a shoe carried by one of the plates, an inflatable bag held between the plates, an air bulb, and an extensible tube connecting the bulb with the bag, whereby provision is made for inflating the bag to depress one of the plates and thereby apply the brake, substantially as described.

5. The combination, with the bicycle, of the pneumatic brake arranged between the steering fork and the bicycle wheel, the inflatable bag for actuating the brake, the air bulb on one of the handles of the machine, and the tube connecting the bulb and bag, the tube extending through the steering fork and one of the handle bars, substantially as described.

WILLIAM B. WALLACE.

Witnesses:
WM. A. WALLACE,
MAURICE HICKEY.